United States Patent
Ishikawa et al.

(10) Patent No.: US 7,508,166 B2
(45) Date of Patent: Mar. 24, 2009

(54) CHARGE CONDITION ADJUSTING APPARATUS

(75) Inventors: Satoshi Ishikawa, Shizuoka (JP); Tsutomu Saigo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 140 days.

(21) Appl. No.: 11/730,420

(22) Filed: Apr. 2, 2007

(65) Prior Publication Data

US 2007/0247115 A1    Oct. 25, 2007

(30) Foreign Application Priority Data

Apr. 12, 2006    (JP) ............................ 2006-109396

(51) Int. Cl.
    *H02J 7/00*    (2006.01)

(52) U.S. Cl. ..................... 320/118; 320/116; 320/119; 320/127

(58) Field of Classification Search .............. 320/116, 320/118, 119, 127, 135, 136

See application file for complete search history.

(56) References Cited

U.S. PATENT DOCUMENTS

| 6,762,588 | B2 * | 7/2004 | Miyazaki et al. ............. 320/116 |
| 2006/0103351 | A1 * | 5/2006 | Tanigawa et al. ............ 320/118 |

FOREIGN PATENT DOCUMENTS

JP    2002-10511    1/2002

* cited by examiner

*Primary Examiner*—Akm E Ullah
*Assistant Examiner*—Richard V Muralidar
(74) *Attorney, Agent, or Firm*—Kratz, Quintos & Hanson, LLP

(57) ABSTRACT

Providing a charge condition adjusting apparatus, which can shorten a time for equalization of each charge in unit cells, a low-voltage CPU selects each smallest unit cell in the each cell block, which has each smallest voltage between the both electrodes, from among plural unit cells structuring the cell blocks. The low-voltage CPU controls ON/OFF of a block-discharging switch to connect the both electrodes of each cell block and each block-discharging resistor for discharging the each cell block until the each voltage between the both electrodes of the selected smallest unit cell reaches the target voltage. Successively, the low-voltage CPU controls ON/OFF of a selecting switches and a cell-discharging switch to connect the both electrodes of each unit cell and each cell-discharging resistor to discharge the each unit cell until the each voltage between the both electrodes of the unit cells reaches the target voltage.

16 Claims, 5 Drawing Sheets

CHARGE CONDITION ADJUSTING APPARATUS

The priority application Number Japan Patent Application 2006-109396 upon which this patent application is based is hereby incorporated by reference.

BACKGROUND OF THE INVENTION

1. Field of the Invention

This invention relates to a charge condition adjusting apparatus, especially, the charge condition adjusting apparatus, which includes a voltage detecting device detecting each voltage between both electrodes (ends) of plural unit cells structured by connecting secondary batteries to each other; a discharging resistor for discharging the unit cell; and an equalizing device controlling discharge through the discharging resistor of the plural unit cells based on the voltages between the both ends of the respective unit cells detected by the voltage detecting device so as to equalize the voltages between both ends of the plural unit cells.

2. Description of the Related Art

A hybrid electric vehicle (HEV) driven together by an engine and an electric motor becomes popular. The HEV includes two types of batteries, which are a low-voltage battery of about 12V for starting the engine and a high-voltage battery for driving the electric motor. The high-voltage battery supplies a high voltage by connecting in series unit cells formed with secondary batteries, such as nickel-metal hydride batteries or lithium ion batteries.

By repeating to charge and discharge the high-voltage battery, respective voltages of both ends of the unit cells change to have various values, that is each charge condition (State-Of-Charge: SOC) is dispersed. For maintaining durability and safety of each unit cell, charging the unit cell may be prohibited when the highest SOC (largest voltage value between the both ends) of the unit cells reaches a presetted upper limit SOC (upper limit voltage value between the both ends), and discharging the unit cell may be prohibited when the lowest SOC (lowest voltage value between the both ends) of the unit cells reaches a presetted lower limit SOC (lower limit voltage value between the both ends).

Thereby, when the each unit cell has various SOC, a usable capacity of the battery is reduced actually. In the HEV, supplementing battery energy to a gasoline engine for hill-climbing, and regenerating energy back to the battery when go downhill, that is by assisting/regenerating, are not acted sufficiently, and actual power performance and fuel consumption ratio are reduced.

A discharge-type charge condition adjusting apparatus, which reduces dispersion of the voltage between the both ends of the each unit cell by detecting the voltages between the both ends of the plural unit cells, calculating an average voltage of the voltages between the both ends, connecting a unit cell, which has the voltage between the both ends larger than the average voltage, to a discharge resistor provided at each unit cell, and repeating to discharge charged capacity in the unit cell until the voltage between the both ends of the connected unit cell reaches the average voltage, is proposed in Patent Document 1. The Patent document 1 is JP2002-10511.

SUMMARY OF THE INVENTION

Objects to be Solved

According to the aforesaid charge condition adjusting apparatus by prior art, each unit cell is discharged step-by-step by connecting the discharge resistor to the unit cell in sequence, it requires much time to equalize the each unit cell. According to the charge condition adjust apparatus by prior art, determining a adjust discharge time, in which the voltage between the both electrodes (ends) of the unit cell reaches an adjust target value, based on the adjust target value and the voltage between the both ends of the unit cell, the each unit cell is discharged in the adjust target time. Thereby, calculating the adjust target values for respective unit cells is required, so that complicated calculation is required and the cost is increased.

One object of the present invention is to provide a charge condition adjusting apparatus which can reduce a time for equalization of voltages between both ends of unit cells.

How to Attain the Object of the Present Invention

In order to overcome the above problems and attain the object of the present invention, a charge condition adjusting apparatus is characterised in that charge condition adjusting apparatus includes a voltage detecting device detecting each voltage between both electrodes (ends) of plural unit cells structured by connecting secondary batteries to each other; a discharging resistor for discharging the unit cell; and an equalizing device controlling discharge through the discharging resistor of the plural unit cells based on the voltages between the both ends of the respective unit cells detected by the voltage detecting device so as to equalize the voltages between both electrodes of the plural unit cells, and the plural unit cells are segmented to plural cell blocks, and the equalizing device includes a first equalizing unit selecting a smallest unit cell in the cell block, which has a smallest voltage between the both ends thereof among the plural unit cells of the cell block, and discharging each cell block by connecting both ends of the cell block and the discharging resistor until the voltage between the both ends of the smallest unit cell in the cell block reaches a target voltage, and a second equalizing unit discharging each unit cell by connecting the both ends of the each unit cell and the discharging resistor until the each voltage between the both ends of the plural unit cells in each cell block reaches the target voltage after discharging by the first equalizing unit is completed.

The charge condition adjusting apparatus as mentioned above is characterised in that the target voltage is defined by the smallest value among the voltages between the both ends of the each unit cells detected by the voltage detecting device.

The charge condition adjusting apparatus as mentioned above is characterised in that the first equalizing unit includes a first discharging unit discharging the each cell block in a first predetermined period and a first discharge-control unit detecting the voltage between the both ends of the smallest unit cell in the cell block by the voltage detecting device whenever discharging by the first discharging unit is completed, and making the first discharging unit to repeat discharging the cell block until the detected voltage between the both ends of the smallest unit cell in the cell block reaches the target voltage.

The charge condition adjusting apparatus mentioned above is characterised in that the second equalizing unit includes a second discharging unit discharging the unit cell in a second predetermined period and a second discharge-control unit detecting the voltage between the both ends of the unit cell by the voltage detecting device whenever discharging by the second discharging unit is completed, and making the second discharging unit to repeat discharging the unit cell until the detected voltage between the both ends of the unit cell reaches the target voltage.

The charge condition adjusting apparatus mentioned above is characterised in that the first equalizing unit judges that the voltage between the both ends of the smallest unit cell in the cell block reaches the target voltage when a difference between the voltage between the both ends of the smallest unit cell in the cell block and the target voltage becomes an allowable voltage tolerance or less, wherein the second equalizing unit judges that the voltage between the both ends of the unit cell reaches the target voltage when a difference between the voltage between the both ends of the unit cell and the target voltage becomes an allowable voltage tolerance or less.

Effect of the Invention

According to the present invention, after discharging plural unit cells structuring the cell block at the same time by the first equalizing unit, each of plural unit cells structuring the cell block can be discharged by the second equalizing unit, so that the equalizing time can be shortened.

According to the present invention, equalizing can be completed faster than equalization, in which the target voltage is defined by an average value of the voltages between the both ends of each unit cell, so that the equalizing time can be shortened.

According to the present invention, the smallest unit cell in the cell block can be discharged until the voltage between the both ends thereof reaches the target voltage without calculating an adjust discharge time based on the target voltage and the voltage between the both ends of the smallest unit cell in the cell block, so that the smallest unit cell in the cell block can be discharged securely until the voltage between the both ends thereof reaches the target voltage without complicated calculation.

According to the present invention, the unit cell can be discharged until the voltage between the both ends thereof reaches the target voltage without calculating the adjust discharge time based on the target voltage and the voltage between the both ends of the unit cell, so that the unit cell can be discharged securely until the voltage between the both ends thereof reaches the target voltage without complicated calculation.

According to the present invention, criteria of judging by the first equalizing unit whether or not the target voltage is reached is set narrower than criteria of judging by the second equalizing unit whether or not the target voltage is reached, so that a capacity to be discharged in the cell block can be increased. Thereby, the equalizing time can be shortened furthermore.

The above and other objects and features of this invention will become more apparent from the following description taken in conjunction with the accompanying drawings.

DESCRIPTION OF THE PREFERRED EMBODIMENT

Figure 1:
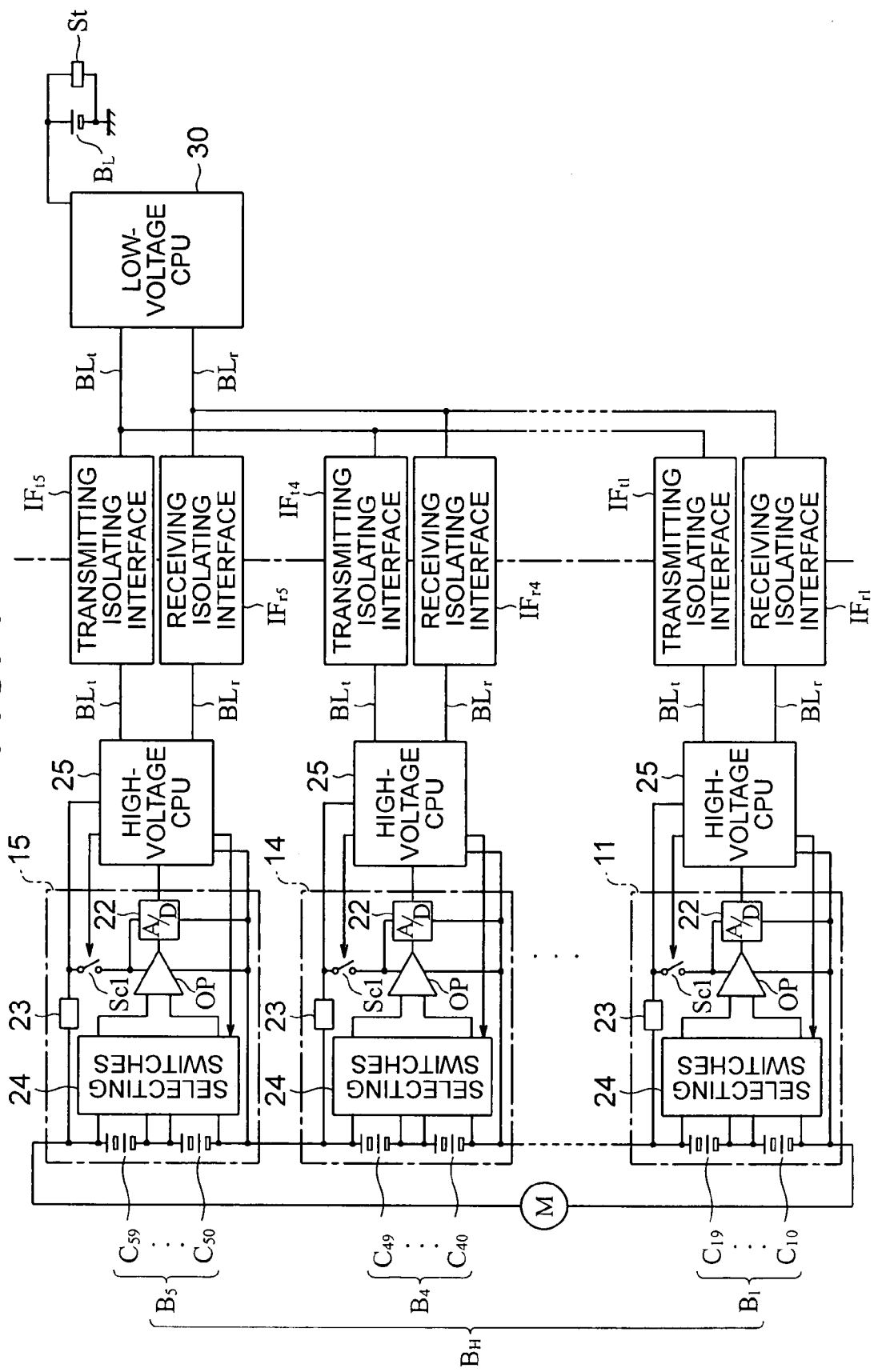
FIG. 1 is a circuit diagram of an embodiment of a charge condition adjusting apparatus according to the present invention.
Figure 2:
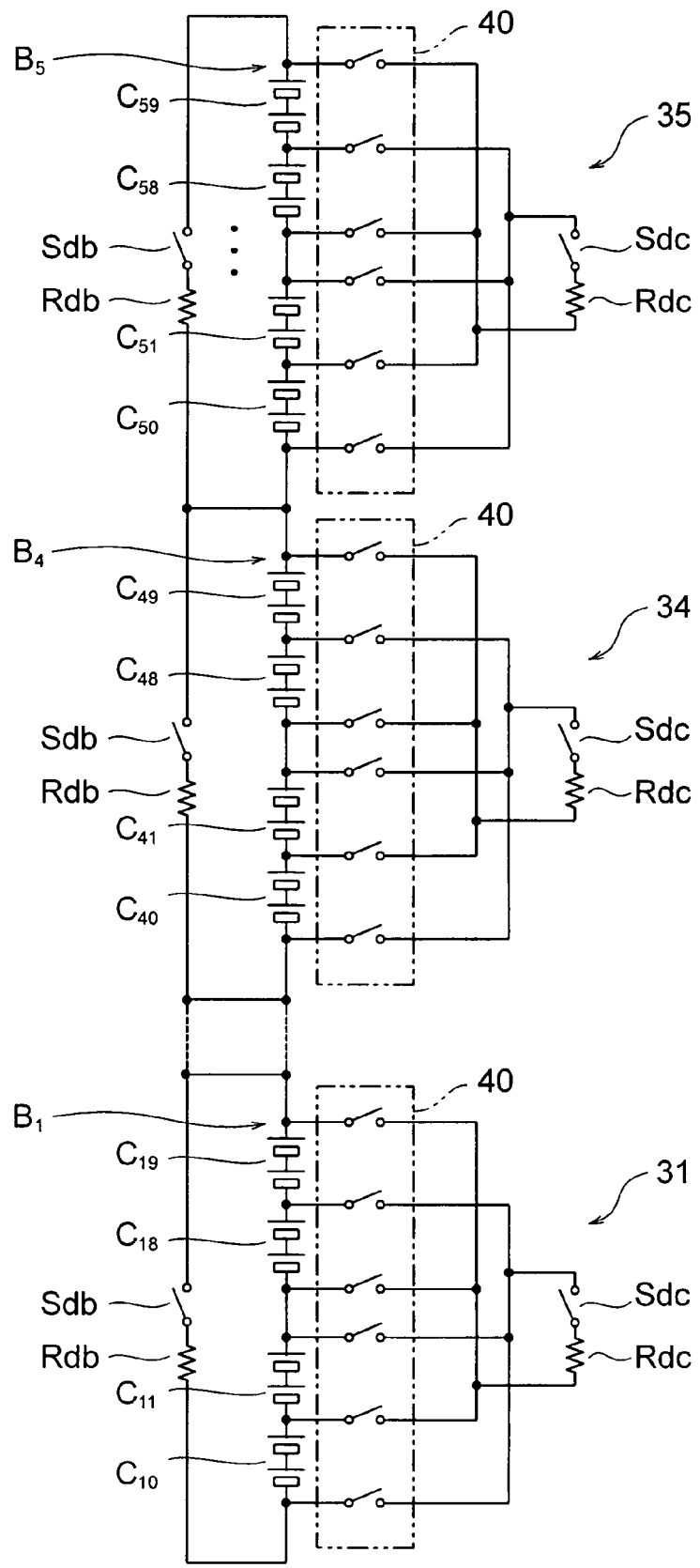
FIG. 2 is a partial circuit diagram of the charge condition adjusting apparatus shown in FIG. 1.

An embodiment according to the present invention will be described with reference to Figures. FIGS. 1 and 2 are circuit diagrams of the embodiment of the charge condition adjusting apparatus according to the present invention. The common components in FIGS. 1 and 2 are put with the same marking. $B_L$ in FIG. 1 is a low-voltage battery. The low-voltage battery $B_L$ is formed with for example one secondary battery. The low-voltage battery $B_L$ is used as an activating power source of a starter St for starting an engine, and both ends thereof are connected with an alternator as a charger if required.

$B_H$ in FIG. 1 is a high-voltage battery. The high-voltage battery $B_H$ is used as a power source of an electric motor M of an HEV using the electric motor M and an engine together as driving forces. The electric motor M is connected to both electrodes (ends) of the high-voltage battery $B_H$ as a load when required, and an alternator (not shown) is connected to the both ends of the high-voltage battery as a charger if required.

The high-voltage battery $B_H$ is segmented to five cell blocks from $B_1$ to $B_5$. Each cell blocks $B_1$-$B_5$ is formed respectively with ten unit cells, $C_{10}$-$C_{19}$, $C_{40}$-$C_{49}$ or $C_{50}$-$C_{59}$. The each unit cells $C_{10}$-$C_{59}$ are structured by two secondary battery. In this embodiment, the unit cells $C_{10}$-$C_{59}$ are structured by two secondary battery, but also can be structure by one or more secondary batteries. The high-voltage battery $B_H$ is structured by 50 unit cells $C_{10}$-$C_{59}$, but can be structured by any plural unit cells. Each cell blocks $B_1$-$B_5$ is formed respectively with ten unit cells $C_{10}$-$C_{59}$, but can be formed with ant plural unit cells.

The charge condition adjusting apparatus includes voltage detecting circuits 11-15 as a voltage detecting device, high-voltage CPUs 25, a low-voltage CPU 30 (FIG. 1) and discharging circuits 31-35 (FIG. 2). The low-voltage CPU 30 is supplied electric power from the low-voltage battery B for acting, and controls the voltage detecting circuits 11-15 and the discharging circuits 31-35 through each high-voltage CPU 25. The high-voltage CPUs 25 and the voltage detecting circuits 11-15 are arranged corresponding to each cell block $B_1$-$B_5$. The each high-voltage CPU 25 and each voltage detecting circuit 11-15 are supplied electric power only by unit cells structuring one cell block from among plural cell blocks $B_1$-$B_5$, which corresponds to the high-voltage CPU 25 and the voltage detecting circuit. In other words, a negative electrode of the corresponding cell block is defined as a ground of the high-voltage CPU 25 and the voltage detecting circuit, thereby the each high-voltage CPU 25 and each voltage detecting circuit has a different ground potential to each other. Thereby, dielectric voltage of components structuring the voltage detecting circuits 11-15 can be reduced.

The high-voltage CPU 25 is connected with a storage unit (not shown) storing an address of the cell block $B_1$-$B_5$ corresponding thereto. The each voltage detecting circuit 11-15 includes a differential amplifier OP detecting each voltage between both electrodes (ends) of each unit cell $C_{10}$-$C_{59}$, selecting switches 24 connecting the differential amplifier OP to the both ends of one unit cell among the unit cells $C_{10}$-$C_{59}$ structuring each cell block $B_1$-$B_5$, and an A/D converter 22 converting the voltage between the both ends detected by the differential amplifier OP to a digital datum. The selecting switches 24 are formed with normal-open switches provided at the both ends of the unit cell $C_{10}$-$C_{59}$. The selected switches 24 are turned ON/OFF by control of the high-voltage CPU 25.

The each voltage detecting circuits 11-15 includes a high-voltage power circuit 23 supplying constant voltage as an activating power source of the differential amplifier OP, the A/D converter 22 and the high-voltage CPU 25 from supply voltage of the each cell block $B_1$-$B_5$ corresponding thereto, and a circuit breaker Sc1 provided between the high-voltage power circuit 23 and the differential amplifier OP and between the high-voltage power circuit 23 and the A/D converter 22. ON/OFF of the circuit breaker Sc1 is controlled by the high-voltage CPU 25. The each voltage detecting circuit 25 is structured by one chip device.

A transmitting bus line $BL_t$ and a receiving bus line $BL_r$ are arranged between the each high-voltage CPU 25 and the low-voltage CPU 30. The transmitting bus line $BL_t$ and a receiving bus line $BL_r$ are respectively branched from the low-voltage CPU 25 toward the plural high-voltage CPUs 25. A transmitting isolating interface $IF_{t1}$-$IF_{t5}$ and a receiving isolating interface $IF_{r1}$-$IF_{r5}$ are arranged respectively in the branched transmitting bus line $BL_t$ and the branched receiving bus line $BL_r$.

The transmitting isolating interface $IF_{t1}$-$IF_{t5}$ and the receiving isolating interface $IF_{r1}$-$IF_{r5}$ are provided to connect each high-voltage CPUs 25 and the low-voltage CPU 30 with electrical isolation. The low-voltage CPU 30 and the high-voltage CPUs 25 can transmit and receive information to be electrically isolated to each other through the transmitting isolating interface $IF_{t1}$-$IF_{t5}$ and the receiving isolating interface $IF_{r1}$-$IF_{r5}$. Thereby, it can be maintained to isolate the high-voltage battery and the low voltage battery. As the isolating interfaces $IF_{t1}$-$IF_{t5}$ and $IF_{r1}$-$IF_{r5}$, a device through an optical medium, such as a photo-coupler with a light-emitting element and a light-receiving element and a device through a magnetic medium, such as a magnetic coupler are well known.

The each discharge circuit 31-35 includes a cell-discharging resistor Rdc (discharging resistor) provided corresponding to each cell block $B_1$-$B_5$, a cell-discharging switch Sdc provided corresponding to the each cell-discharging resistor Rdc and selecting switches 40 structured by a switch provided between the both ends of each unit cell $C_{10}$-$C_{59}$ structuring each cell block $B_1$-$B_5$. The selecting switches 40 can be applied in common with the selecting switches 24 structuring the voltage detecting circuit 11-15. According to the above structure, when the switch provided between the both ends of any unit cell $C_m$ from among the selecting switches 40 is turned ON in a condition of turning the cell-discharging switch Sdc ON, the both ends of the any unit cell $C_m$ are connected to the cell-discharging resistor Rdc. Thereby, the any unit cell $C_m$ is discharged through the cell-discharging resistor Rdc.

The each discharge circuit 31-35 further includes a block-discharging resistor Rdb (discharging resistor) provided between both ends of each cell block $B_1$-$B_5$ and a block-discharging switch Sdb provided between the each cell block $B_1$-$B_5$ and the block-discharging resistor Rdb. When the block-discharging switch Sdb is turned ON, the both ends of the cell block $B_1$-$B_5$ corresponding to the block-discharging switch Sdb turned ON are connected to the block-discharging resistor, and the cell block $B_1$-$B_5$ is discharged through the block-discharging resistor Rdb.

Figure 3A:
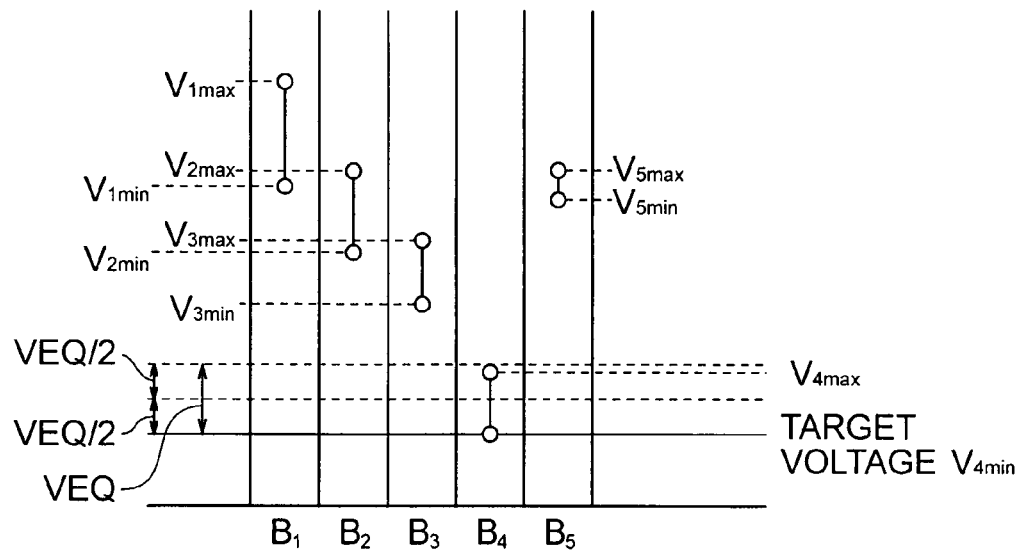
FIG. 3A is a graph of voltages of both electrodes of unit cells for explaining an action of the charge condition adjusting apparatus shown in FIG. 1.

Actions of the charge condition adjusting apparatus structured above will be described in outline with reference to FIGS. 3A, 3B and 3C. A vertical axis in FIGS. 3A, 3B, 3C corresponds to the voltage between the both ends of each unit cell $C_{10}$-$C_{59}$. A horizontal axis in FIGS. 3A, 3B, 3C corresponds to each cell block $B_1$-$B_5$. In this embodiment, the voltages between the both ends of respective unit cells $C_{10}$-$C_{59}$ are equalized to make dispersion of the voltages between the both ends of the unit cells $C_{10}$-$C_{59}$ become within an allowable voltage tolerance VEQ. As shown in FIG. 3A, the voltages between the both ends of unit cells $C_{10}$-$C_{19}$ structuring the cell block $B_1$ disperse in a range of $V_{1min}$-$V_{1max}$. Similarly, the voltages between the both ends of unit cells $C_{20}$-$C_{29}$ structuring the cell block $B_2$ disperse in a range of $V_{2min}$-$V_{2max}$. Similarly, the voltages between the both ends of unit cells $C_{30}$-$C_{39}$ structuring the cell block $B_3$ disperse in a range of $V_{3min}$-$V_{3max}$, and the voltages between the both ends of unit cells $C_{40}$-$C_{49}$ structuring the cell block $B_4$ disperse in a range of $V_{4min}$-$V_{4max}$, and the voltages between the both ends of unit cells $C_{50}$-$C_{59}$ structuring the cell block $B_5$ disperse in a range of $V_{5min}$-$V_{5max}$.

In a condition before equalizing, the voltages between the both ends of unit cells $C_{10}$-$C_{59}$ disperse over the allowable voltage tolerance VEQ, as shown in FIG. 3A. The charge condition adjusting apparatus selects each smallest unit cell in the each cell block $B_1$-$B_5$, which has each smallest voltage between the both ends $V_{1min}$-$V_{5min}$, from among plural unit cells $C_{10}$-$C_{59}$ structuring the cell blocks $B_1$-$B_5$. Thereafter, the charge condition adjusting apparatus connects the both ends of each cell block $B_1$-$B_5$ and each block-discharging resistor Rdb to discharge the each cell block $B_1$-$B_5$ until the each voltage between the both ends $V_{1min}$-$V_{5min}$ of the selected smallest unit cell in the each cell block reaches a target voltage. In this embodiment, the voltage between the both ends $V_{4min}$, which is the smallest voltage between the both ends among the voltages between the both ends of plural unit cells $C_{10}$-$C_{59}$, is defined as the target voltage. In this embodiment, as shown in FIG. 3B, when a difference of the each voltage between the both ends $V_{1min}$-$V_{5min}$ of the smallest unit cell in the each cell block and the target voltage $V_{4min}$ becomes a value smaller than the allowable voltage tolerance VEQ, for example a half value of the allowable voltage tolerance VEQ (that is VEQ/2), it is defined that the each voltage between the both ends $V_{1min}$-$V_{5min}$ reaches the target voltage $V_{4min}$.

Figure 3B:
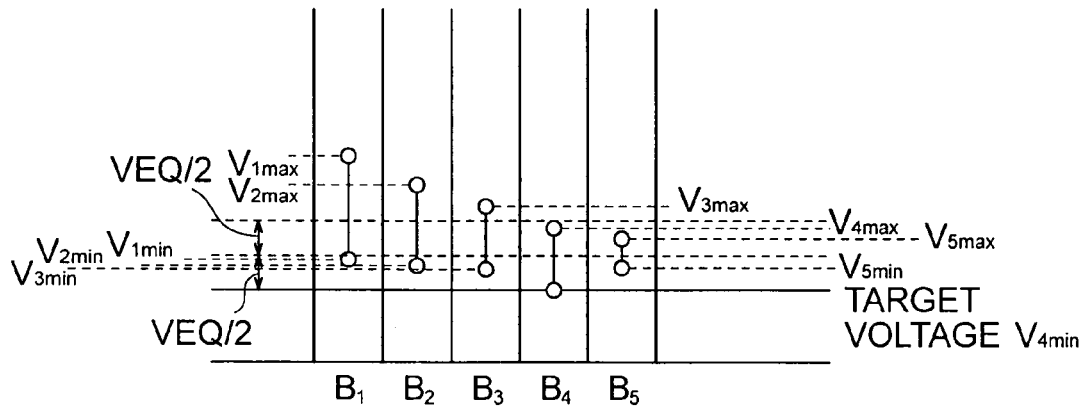
FIG. 3B is a graph of voltages of both electrodes of unit cells for explaining an action of the charge condition adjusting apparatus shown in FIG. 1.
Figure 3C:
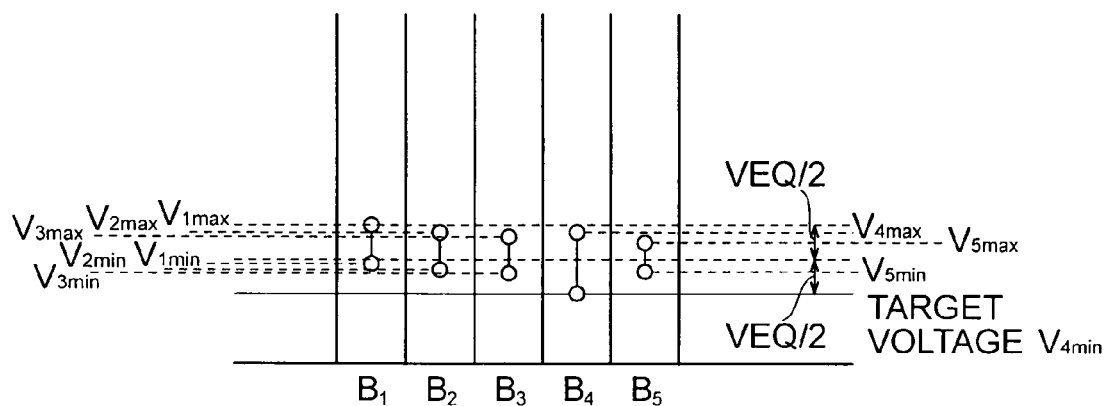
FIG. 3C is a graph of voltages of both electrodes of unit cells for explaining an action of the charge condition adjusting apparatus shown in FIG. 1.

Thereby, as shown in FIG. 3B, the each voltage between the both ends $V_{1min}$-$V_{5min}$ of the selected smallest unit cell in the each cell block $B_1$-$B_5$ reaches within a range (from $V_{4min}$ to $V_{4min}$+VEQ/2) capable to become the target voltage $V_{4min}$. Since the each cell block is discharged as one unit, the voltages between the both ends of the unit cells other than the smallest unit cell in the cell block are reduced about the same voltage drop as the voltage drop between the both ends of the smallest unit cell in the cell block and approach toward the target voltage $V_{4min}$.

Thereafter, the charge condition adjusting apparatus connects the both ends of the each unit cell $C_{10}$-$C_{59}$ and the cell-discharging resistor Rdc, and discharges the each unit cell $C_{10}$-$C_{59}$ until the each voltage between the both ends of the plural unit cells $C_{10}$-$C_{59}$ structuring the cell blocks $B_1$-$B_5$ reaches the target voltage $V_{4min}$. In this embodiment, as shown in FIG. 3C, when a difference of the each voltage between the both ends of the each unit cell $C_{10}$-$C_{59}$ until and the target voltage $V_{4min}$ becomes a value equal to or smaller than the allowable voltage tolerance VEQ, it is defined that the each voltage between the both ends reaches the target voltage $V_{4min}$. Thereby, as shown in FIG. 3C, the voltages between the both ends of unit cells can be equalized so as to control dispersion of the voltages between the both ends of the all unit cells $C_{10}$-$C_{59}$ within the allowable voltage tolerance VEQ.

Figure 4:
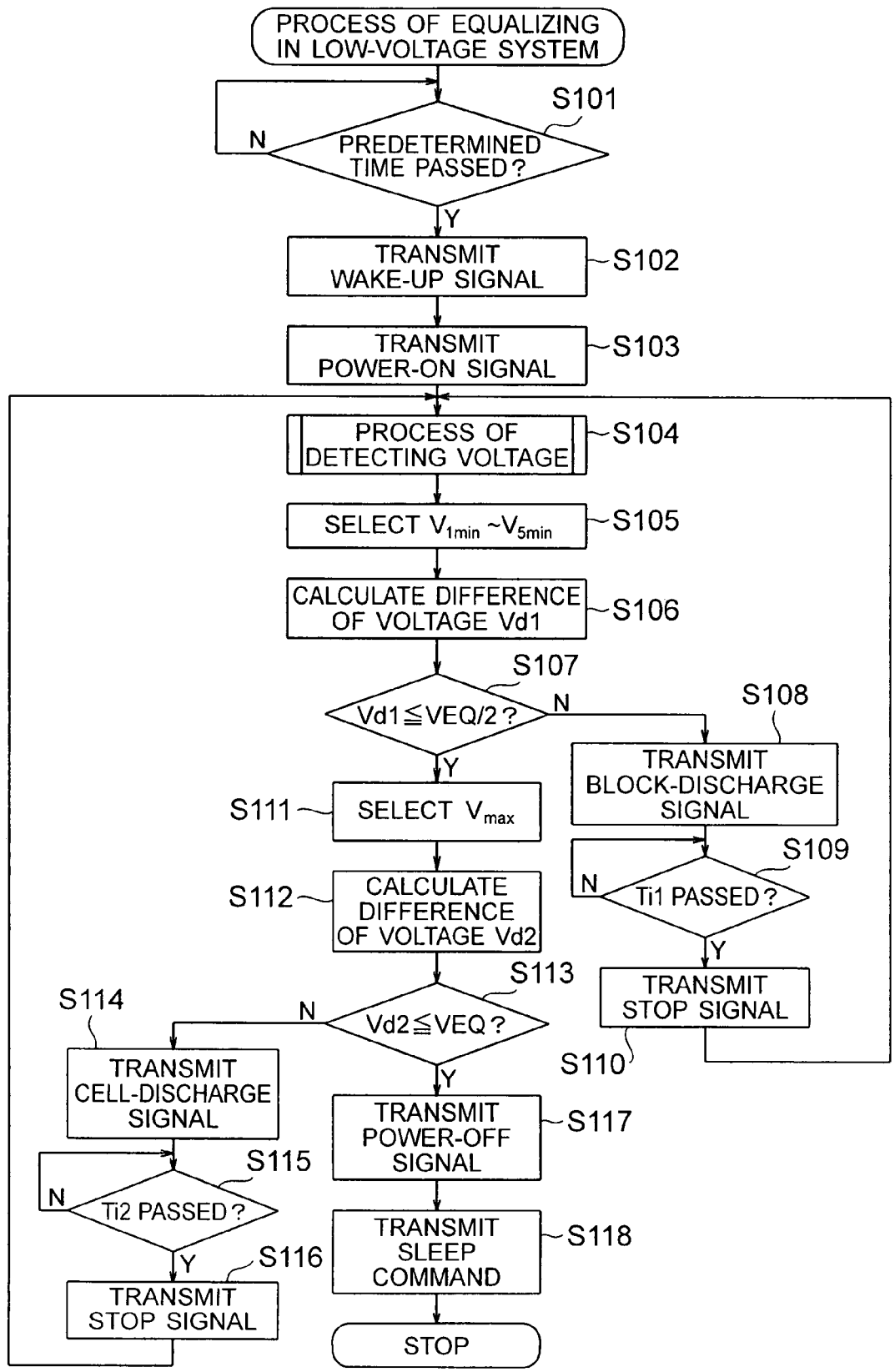
FIG. 4 is a flow chart of processes for equalization of a low-voltage system in a low-voltage CPU structuring the charge condition adjusting apparatus shown in FIG. 1.
Figure 5:
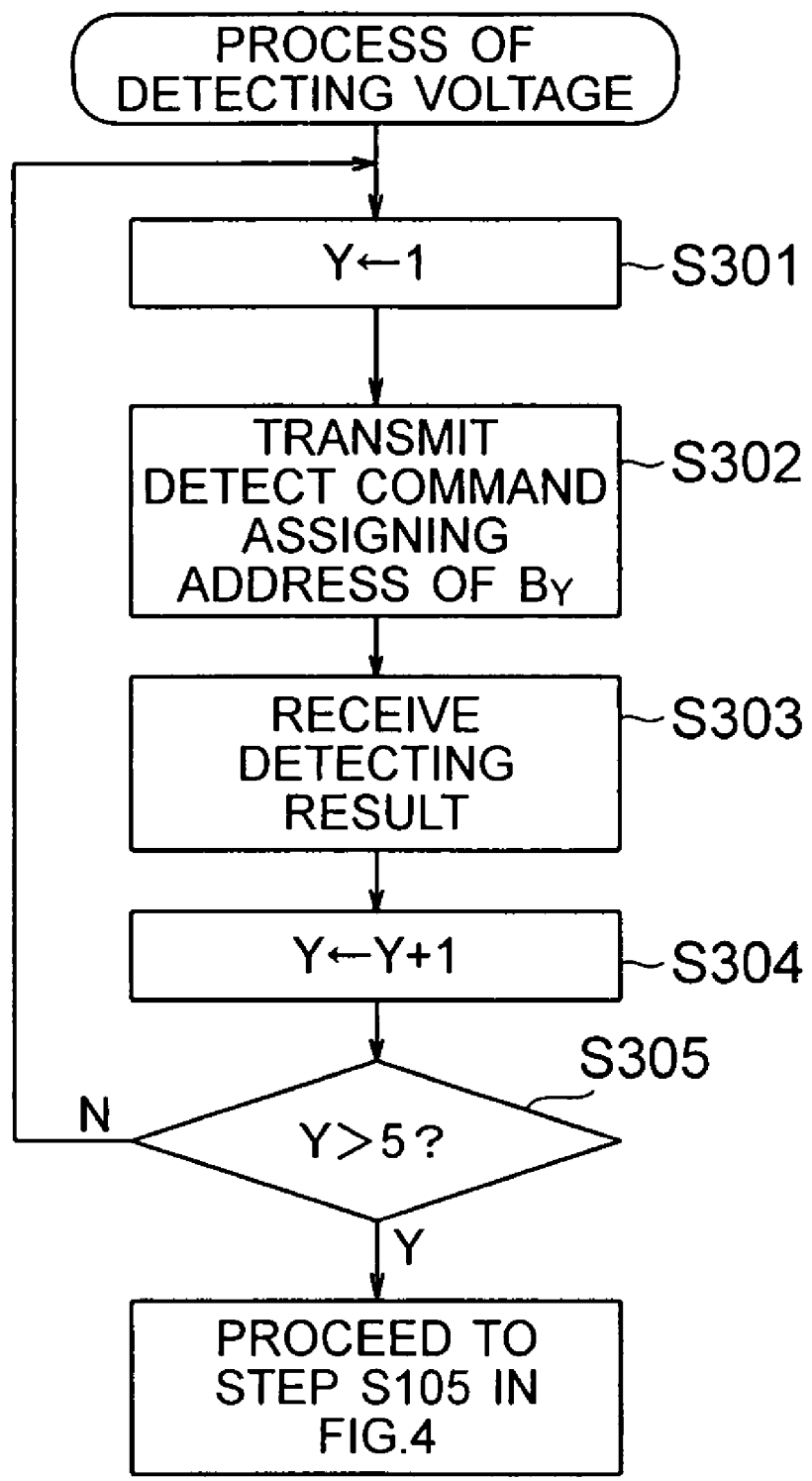
FIG. 5 is a flow chart of processes for equalization of the low-voltage system in a high-voltage CPU structuring the charge condition adjusting apparatus shown in FIG. 1.

Actions of the charge condition adjusting apparatus structured above will be described in detail with reference to FIGS. 4, 5. FIG. 4 is a flowchart showing process of equalizing in a low-voltage system by the low-voltage CPU 30 structuring the charge condition adjusting apparatus shown in FIG. 1. FIG. 5 is a flowchart showing process of detecting voltages by the low-voltage CPU 30 structuring the charge condition adjusting apparatus shown in FIG. 1.

After an ignition switch is turned OFF, the low-voltage CPU 30 acts as the equalizing device to start process of equalizing in low-voltage system. First, the low-voltage CPU 30 waits to pass a predetermined time until the voltage of the high-voltage battery $B_H$ becomes stable after the ignition switch is turned OFF (step S101). Thereafter, the low-voltage CPU 30 outputs a wake-up signal to the transmitting bus line $BL_t$ (step S102), and successively outputs a power-on signal (step S103) The wake-up signal and the power-on signal are branched by the transmitting bus line $BL_t$ and supplied through each transmitting isolating interface $IF_{t1}$-$IF_{t5}$ to the high-voltage CPU 25 of the each cell block $B_1$-$B_5$. The wake-up signal and the power-on signal are transmitted in series to the all high-voltage CPUs 25.

When the high-voltage CPU 25 receives the wake-up signal, the high-voltage CPU 25 switches an operating clock from a low frequency clock to a high frequency clock to shift from a sleep mode to a normal mode. When the high-voltage CPU 25 receives the power-on signal, the high-voltage CPU 25 turns the circuit breaker Sc1 ON. Thereby, the differential amplifier OP and the A/D converter 22 structuring the voltage detecting circuit 11-15 are supplied electric power from the each cell block $B_1$-$B_5$ corresponding thereto.

After the low-voltage CPU 30 transmits the wake-up signal and the power-on signal as shown in FIG. 4 (steps S102, S103), the low-voltage CPU 30 executes process of detecting voltage to detect the each voltage between the both ends of all unit cells $C_{10}$-$C_{59}$ (step S104). In the process of detecting voltage, as shown in FIG. 5, after the low-voltage CPU 30 assigns "1" to a memory address Y provided in a storage device (not shown) (step S301), the low-voltage CPU 30 outputs a command of detecting, which assigns an address of the cell block $B_Y$, to the transmitting bus line BL (step S302). The command of detecting is branched by the transmitting bus line $BL_t$ and supplied through each transmitting isolating interface $IF_{t1}$-$IF_{t5}$ to the high-voltage CPU 25 of the each cell block $B_1$-$B_5$. In other words, the command of detecting is transmitted to all high-voltage CPUs 25.

When the high-voltage CPU 25 receives the command of detecting, if the command of detecting addresses to the own address, the high-voltage CPU 25 executes to detect the voltage, and if the command of detecting does not address to the own address, the high-voltage CPU 25 does not execute to detecting the voltage. Describing detecting voltage in detail, the high-voltage CPU 25 controls the selecting switches 24 to connect sequentially the both ends of the each unit cell $C_{Y0}$-$C_{Y9}$ structuring the cell block $B_Y$ to the differential amplifier OP. Thereby, a digital datum of the each voltage between the both ends of the unit cell $C_{Y0}$-$C_{Y9}$ structuring the cell block $B_Y$ is supplied sequentially from the A/D converter 22 to the high-voltage CPU 25. According thereto, the high-voltage CPU 25 transmits the digital data of the voltages between the both ends of the unit cell $C_{Y0}$-$C_{Y9}$ assigning own address to the receiving isolating interface $IF_{rY}$. The digital data of the voltages between the both ends of the unit cell $C_{Y0}$-$C_{Y9}$ transmitted to the receiving isolating interface $IF_{rY}$ are received through the receiving bus line $BL_r$ by the low-voltage CPU 30.

When the low-voltage CPU 30 receives the digital data of the voltage between the both ends of unit cell $C_{Y0}$-$C_{Y9}$ assigning the address of the cell block $B_Y$, the low-voltage CPU 30 stores the digital data in the storage device (not shown) (step S303 in FIG. 5) and inputs "Y+1" to the memory address Y (step S304). Thereby, when the datum Y is not larger than 5 (N at step S305), the process of the low-voltage CPU 30 returns to step S301). On the other hand, when the datum Y is larger than 5 (Y at step S305), the process of detecting voltages of all unit cells $C_{10}$-$C_{59}$ is completed and the process of the low-voltage CPU 30 proceeds to step S105 in FIG. 4.

The low-voltage CPU 30 selects the minimum voltages between the both ends $V_{1min}$-$V_{5min}$ of unit cells $C_{10}$-$C_{59}$ about each cell block $B_1$-$B_5$ (step S105). The low-voltage CPU 30 calculates difference of voltage Vd1 by subtracting a minimum voltage (target voltage) from a maximum voltage among the selected minimum voltages between the both ends $V_{1min}$-$V_{5min}$ (step S106). The low-voltage CPU 30 performs as a first discharge-control unit, and when the difference of voltage Vd1 is not larger than VEQ/2 (Y at step S107), the process proceeds directly to step S111.

When the difference of voltage Vd1 is larger than VEQ/2 (N at step S107), the low-voltage CPU 30 selects the unit cell $C_{nm}$ having the maximum voltage among the selected voltages between the both ends $V_{1min}$-$V_{5min}$, and outputs a block-discharge signal assigning an address of the cell block $B_n$ including the selected unit cell $C_{nm}$ to the transmitting bus line $BL_t$ (step S108). The block-discharge signal is branched by the transmitting bus line $BL_t$ and supplied through the each transmitting isolating interface $IF_{t1}$-$IF_{t5}$ to the high-voltage CPUs 25 of the each cell block $B_1$-$B_5$.

When the own address of the high-voltage CPU 25 is assigned by the received block-discharge signal, the high-voltage CPU 25 turns the block-discharge switch Sdb ON. Thereby, the both ends of the cell block $B_n$ are connected with the block-discharging resistor Rdb and discharging of the cell block $B_n$ through the block-discharging resistor Rdb is started. When the own address of the high-voltage CPU 25 is not assigned by the received block-discharge signal, the high-voltage CPU 25 takes no action.

Thereafter, the low-voltage CPU 30 waits a discharge time Ti1 (first predetermined period) passing (Y at step S109), and after outputting a stop signal assigning the address of the cell block $B_n$ to the transmitting bus line $BL_t$ (step S110), the process of the low-voltage CPU 30 returns to the step S104. The stop signal is branched by the transmitting bus line $BL_t$ and supplied through each transmitting isolating interface $IF_{t1}$-$IF_{t5}$ to the high-voltage CPU 25 of the each cell block $B_1$-$B_5$. When the high-voltage CPU 25 receives the stop signal assigning the own address thereof, the high-voltage CPU 25 turns all of the block-discharge switch Sdb, selecting switches 40 and the cell-discharge switch Sdc OFF. Thereby, the cell block $B_n$ is disconnected from the block-discharging resistor Rdb, and discharge of the cell block $B_n$ is stopped.

According to actions by the process of equalization steps S108-S110 in the low-voltage system as shown in FIG. 4, the low-voltage CPU 30 performs as a first discharging unit to connect the both ends of the cell block $B_n$ and the block-discharging resistor Rdb and to discharge the cell block $B_n$ in the discharge time Ti1. Thereby, the same charge amount from each unit cell $C_{n0}$-$C_{n9}$ structuring the cell block $B_n$ is discharged. The discharge of the cell block $B_1$-$B_5$ according to the steps S108-S110 is repeated until the difference of voltage Vd1 calculated in step S106 becomes to be not larger than VEQ/2. In other words, the discharge of the cell block $B_1$-$B_5$ is repeated until the difference of the each voltage between the both ends $V_{1min}$-$V_{5min}$ of the smallest unit cell in the each cell block and the target voltage $V_{4min}$ becomes the value smaller than VEQ/2. Thus, the low-voltage CPU 30 corresponds to a first equalizing unit.

When the discharge is repeated and the difference of voltage Vd1 becomes not larger than VEQ/2 (Y at step S107), the low-voltage CPU 30 selects the maximum value $V_{max}$ among the voltages between the both ends of each unit cells $C_{10}$-$C_{59}$ detected at step S104 (step S11). Thereafter, the low-voltage CPU 30 calculates a difference of voltage Vd2 between the selected maximum value $V_{max}$ and the minimum value (target voltage) among the voltages between the both ends $V_{1min}$-$V_{5min}$ (step S112). The low-voltage CPU 30 performs as a second discharging unit, and when the difference of voltage Vd2 is not larger than the allowable voltage tolerance VEQ (Y at step S113), the process proceeds to step S117.

Oppositely, when the difference of voltage Vd2 is larger than the allowable voltage tolerance VEQ (N at step S113), the low-voltage CPU 30 selects the unit cell $C_{nm}$ having the selected maximum value $V_{max}$, and outputs a cell-discharging signal for commanding discharge of the unit cell $C_{nm}$ to be assigned an address of the cell bock $B_n$ including the selected unit cell $C_{nm}$ to the transmitting bus line $BL_t$ (step S114). The cell-discharging signal is branched by the transmitting bus line $BL_t$, and supplied through the each transmitting isolating interface $IF_{t1}$-$IF_{t5}$ to the high-voltage CPUs 25 of the each cell block $B_1$-$B_5$.

When the high-voltage CPU 25 receives the cell-discharging signal assigning the own address thereof, the high-voltage CPU 25 turns the switch, which is connected with the both ends of the unit cell $C_{nm}$ among the switches structuring the selecting switches 40, and the cell-discharging switch Sdc ON. Thereby, the only unit cell $C_{nm}$ among the unit cells $C_{10}$-$C_{59}$ structuring the cell block $B_n$ starts to be discharged through the cell-discharging resistor Rdc.

Thereafter, the low-voltage CPU 30 waits a discharge time Ti2 (second predetermined period) passing (Y at step S115), and after outputting a stop signal assigning the address of the cell block $B_n$ to the transmitting bus line $BL_t$ (step S116), the process of the low-voltage CPU 30 returns to the step S104. The stop signal is branched by the transmitting bus line $BL_t$ and supplied through each transmitting isolating interface $IF_{t1}$-$IF_{t5}$ to the high-voltage CPU 25 of the each cell block $B_1$-$B_5$. When the high-voltage CPU 25 receives the stop signal assigning the own address thereof, the high-voltage CPU 25 turns all of the block-discharge switch Sdb, selecting switches 40 and the cell-discharge switch Sdc OFF. Thereby, the unit cell $C_{nm}$ is disconnected from the cell-discharging resistor Rdc, and discharge of the unit cell $C_{nm}$ is stopped.

According to actions by the process of equalization steps S114-S116 in the low-voltage system as shown in FIG. 4, the low-voltage CPU 30 performs as a second discharging unit to connect the both ends of the unit cell $C_{nm}$ having the maximum value among the voltage between the both ends of the unit cells $C_{10}$-$C_{59}$ and the cell-discharging resistor Rdc and to discharge the unit cell $C_{nm}$ in the discharge time Ti2. The discharge of the each unit cell $C_{10}$-$C_{59}$ according to the steps S114-S116 is repeated until the difference of voltage Vd2 calculated in step S113 becomes to be not larger than VEQ (allowable voltage tolerance). In other words, the discharge of the unit cells $C_{10}$-$C_{59}$ is repeated until the difference of the voltage between the both ends of the each unit cell $C_{10}$-$C_{59}$ and the target voltage becomes the value smaller than VEQ (allowable voltage tolerance). Thus, the low-voltage CPU 30 corresponds to a second equalizing unit.

When the discharge is repeated and the difference of voltage Vd2 becomes not larger than VEQ (allowable voltage tolerance) (Y at step S113), the low-voltage CPU 30 judges that the dispersion of the voltages between the both ends of the unit cell $C_{10}$-$C_{59}$ is reduced within the allowable voltage tolerance VEQ. Thereafter, the low-voltage CPU 30 transmits a power-off signal (step S117), and successively transmits a sleep command (step S118), and finishes the process of the equalization in the low-voltage system.

When the high-voltage CPU 25 receives the power-off signal, the high-voltage CPU 25 turns the circuit breaker Sc1 OFF. Thereby, the differential amplifier OP and the A/D converter 22 structuring the voltage detecting circuit 11-15 are stopped supply of electric power from the each cell block $B_1$-$B_5$ corresponding thereto. Thereafter, when the high-voltage CPU 25 receives the sleep command, the high-voltage CPU 25 switches the operating clock from the high frequency clock to the low frequency clock to shift from the normal mode to the sleep mode.

According to the aforesaid charge condition adjusting apparatus, the low-voltage CPU 30 selects each smallest unit cell in the each cell block $B_1$-$B_5$, which has each smallest voltage between the both ends $V_{1min}$-$V_{5min}$, from among plural unit cells $C_{10}$-$C_{59}$ structuring the cell blocks $B_1$-$B_5$. Thereafter, the low-voltage CPU 30 connects the both ends of each cell block $B_1$-$B_5$ and each block-discharging resistor Rdb to discharge the each cell block $B_1$-$B_5$ until the each voltage between the both ends $V_{1min}$-$V_{5min}$ of the selected smallest unit cell in the each cell block reaches the target voltage $V_{4min}$. Successively, the low-voltage CPU 30 connects the both ends of each unit cell $C_{10}$-$C_{59}$ and each cell-discharging resistor Rdc to discharge the each unit cell $C_{10}$-$C_{59}$ until the each voltage between the both ends of the unit cells $C_{10}$-$C_{59}$ structuring the each cell block $B_1$-$B_5$ reaches the target voltage $V_{4min}$. Thereby, after discharging the plural unit cells $C_{10}$-$C_{59}$ structuring cell block $B_1$-$B_5$ at the same time about each cell block $B_1$-$B_5$, plural unit cells $C_{10}$-$C_{59}$ can be discharged one by one, so that time for equalization can be reduced.

According to the charge condition adjusting apparatus, the minimum value $V_{4min}$ among the voltages between the both ends of the each unit cell $C_{10}$-$C_{59}$ structuring is defined as the target voltage, so that equalization thereof can be acted faster than that in which the average value of the voltages between the both ends of the units cell $C_{10}$-$C_{59}$ is defined as the target voltage, and the time for equalization can be more reduced.

According to the charge condition adjusting apparatus, the low-voltage CPU 30 detects the voltages between the both ends $V_{1min}$-$V_{5min}$ of the smallest unit cells in the each cell block $B_1$-$B_5$ and discharges the each cell block $B_1$-$B_5$ in the discharge period Ti1 until the each detected voltage between the both ends $V_{1min}$-$V_{5min}$ reaches the target voltage at every time when the discharge of the each cell block $B_1$-$B_5$ in the discharge period Ti1 is completed. Thereby, complicated calculation for obtaining an adjust discharge period, in which the voltage between the both ends $V_{1min}$-$V_{5min}$ of the smallest unit cell of the cell block reaches the target voltage, based on the target voltage and the voltage between the both ends $V_{1min}$-$V_{5min}$ of the smallest unit cell of the cell block is not required, and the each cell block can be discharged securely until the voltage between the both ends $V_{1min}$-$V_{5min}$ of the smallest unit cell of the cell block becomes the target voltage.

According to the charge condition adjusting apparatus, the low-voltage CPU 30 detects the voltages between the both ends of the unit cells $C_{10}$-$C_{59}$ and repeats to discharge the each unit cell $C_{10}$-$C_{59}$ in the discharge period Ti2 until the each detected voltage between the both ends reaches the target voltage at every time when the discharge of the each unit cell $C_{10}$-$C_{59}$ in the discharge period Ti2 is completed. Thereby, complicated calculation for obtaining an adjust discharge period, in which the voltage between the both ends of the each unit cell $C_{10}$-$C_{59}$ reaches the target voltage, based on the target voltage and the voltage between the both ends of the each unit cell $C_{10}$-$C_{59}$ is not required, and the each unit cell $C_{10}$-$C_{59}$ can be discharged securely until the voltage between the both ends of the each unit cell $C_{10}$-$C_{59}$ becomes the target voltage.

According to the charge condition adjusting apparatus, when the difference of the voltage between the both ends $V_{1min}$-$V_{5min}$ of the smallest unit cell of the cell block and the target voltage becomes not larger than VEQ/2, the low-voltage CPU 30 judges that the voltage between the both ends $V_{1min}$-$V_{5min}$ of the smallest unit cell of the cell block becomes the target voltage. Also, when the difference of the voltage between the both ends of the each unit cell $C_{10}$-$C_{59}$ and the target voltage becomes the value smaller than VEQ (allowable voltage tolerance), the low-voltage CPU 30 judges that the voltage between the both ends of the each unit cell $C_{10}$-$C_{59}$ becomes the target voltage. Thus, by setting criteria of judging that the voltage between the both ends reaches the target voltage when discharging each cell block $B_1$-$B_5$ narrower than criteria of judging that the voltage between the both ends reaches the target voltage when discharging each unit cell $C_{10}$-$C_{59}$, a capacity to be discharged at the each cell block $B_1$-$B_5$ can be increased more. Thereby, the equalizing time can be shortened furthermore.

In the above embodiment, the smallest voltage among the voltages between the both ends of all unit cells $C_{10}$-$C_{59}$ is defined as the target voltage. According to the present invention, the target voltage is not limited as mentioned above, and can be an average value of the voltages between the both ends of the unit cells $C_{10}$-$C_{59}$, or a value smaller than the smallest voltage.

According to the above embodiment, the low-voltage CPU 30 detects the voltages between the both ends $V_{1min}$-$V_{5min}$ of the smallest unit cells in the each cell block $B_1$-$B_5$ and discharges the each cell block $B_1$-$B_5$ in the discharge period Ti1 until the each detected voltage between the both ends $V_{1min}$-$V_{5min}$ reaches the target voltage at every time when the discharge of the each cell block $B_1$-$B_5$ in the discharge period Ti1 is completed. The present invention does not limit such way. Calculating the adjust discharge period, in which the voltage between the both ends $V_{1min}$-$V_{5min}$ of the smallest unit cell of the cell block reaches the target voltage, based on the target voltage and the voltage between the both ends $V_{1min}$-$V_{5min}$ of the smallest unit cell of the cell block, the each cell block $B_1$-$B_5$ can be discharged in the calculated adjust discharge period.

In the above embodiment, the low-voltage CPU 30 in steps S106-S109 of FIG. 4 calculates difference of voltage Vd1 by subtracting a minimum voltage (target voltage) from a maximum voltage among the selected minimum voltages between the both ends $V_{1min}$-$V_{5min}$, and when the difference of voltage Vd1 is larger than VEQ/2, controls the high-voltage CPU 25 to discharge the unit cell $C_{nm}$ having the maximum value among the voltages between the both ends $V_{1min}$-$V_{5min}$ in the discharge period Ti1. The present invention is not limited as mentioned above. In steps S106-S109, the low-voltage CPU 30 can act as follows.

The low-voltage CPU 30 calculates each difference of voltage Vd1 by subtracting a minimum voltage (target voltage) among the selected minimum voltages between the both ends $V_{1min}$-$V_{5min}$ from the each voltage between the both ends $V_{1min}$-$V_{5min}$ (step S106). When the minimum voltage is $V_{4min}$, each difference of the voltage Vd1 is calculated as $(V_{1min}-V_{4min})$, $(V_{2min}-V_{4min})$, $(V_{3min}-V_{4min})$, $(V_{5min}-V_{4min})$.

When at least one Vd1 among the calculated differences of voltage Vd1 larger than the VEQ/2 exists (N at step S107), the low-voltage CPU 30 selects the unit cell $C_{nm}$ having the voltage between the both ends, in which difference of voltage Vd1 subtracted the minimum voltage is larger than the VEQ/2, and outputs the block-discharge signal assigning an address of the cell block $B_n$ including the selected unit cell $C_{nm}$ to the transmitting bus line $BL_t$ (step S108). Thereby, not only the unit cell having the maximum value among the smallest voltages of the both ends voltage between the both $V_{1min}$-$V_{5min}$ but also all unit cells $C_{nm}$ having the voltage between the both ends, in which difference of voltage Vd1 subtracted the minimum voltage is larger than the VEQ/2, can be discharged at the same time.

According to the above embodiment, the low-voltage CPU 30 detects the voltages between the both ends of the unit cells $C_{10}$-$C_{59}$ and repeats to discharge the each unit cell $C_{10}$-$C_{59}$ in the discharge period Ti2 until the each detected voltage between the both ends reaches the target voltage at every time when the discharge of the each unit cell $C_{10}$-$C_{59}$ in the discharge period Ti2 is completed. The present invention is not limited such way. Calculating an adjust discharge period, in which the voltage between the both ends of the each unit cell $C_{10}$-$C_{59}$ reaches the target voltage, based on the target voltage and the voltage between the both ends of the each unit cell $C_{10}$-$C_{59}$, the each unit cell $C_{10}$-$C_{59}$ can be discharged within the calculated adjust discharge period.

According to the above embodiment, the low-voltage CPU 30 selects the unit cell $C_{nm}$ having the maximum value among the voltages between the both ends $V_{1min}$-$V_{5min}$ of the smallest unit cells in the each cell block $B_1$-$B_5$, and discharges the cell block $B_n$ including the unit cell $C_{nm}$ prior to the other cell blocks. The present invention is not limited such way. Each cell block $B_1$-$B_5$ can be discharged sequentially in predetermined sequence. Each cell block $B_1$-$B_5$ can be discharged in any sequence, if the voltages between the both ends $V_{1min}$-$V_{5min}$ of the smallest unit cells in the each cell block $B_1$-$B_5$, would reach the target voltage.

According to the above embodiment, the low-voltage CPU 30 discharges the unit cell $C_{10}$-$C_{59}$ having the maximum value among the voltages between the both ends of the unit cells $C_{10}$-$C_{59}$ prior to the other unit cells $C_{10}$-$C_{59}$. The present invention is not limited such way. The unit cells $C_{10}$-$C_{59}$ can be discharged sequentially in predetermined sequence. The unit cells $C_{10}$-$C_{59}$ can be discharged in any sequence, if the voltages between the both ends of the unit cells $C_{10}$-$C_{59}$ would reach the target voltage.

According to the above embodiment, the charge condition adjusting apparatus includes respectively the block-discharging resistor Rdb for discharging the each cell block $B_1$-$B_5$ and the cell-discharging resistor Rdc for discharging the each unit cell $C_{10}$-$C_{59}$. The present invention is not limited such way. The cell-discharging resistor Rdc can be used as the block-discharging resistor Rdb.

The embodiment mentioned above is a just typical example of the present invention. The present invention is not limited by the embodiment. Modification may be made without departing from the scope of the present invention.

What is claimed is:

1. A charge condition adjusting apparatus comprising:
a voltage detecting device detecting each voltage between both ends of plural unit cells structured by connecting secondary batteries to each other;
a discharging resistor for discharging the unit cell; and
an equalizing device controlling discharge through the discharging resistor of the plural unit cells based on the voltages between the both ends of the respective unit cells detected by the voltage detecting device so as to equalize the voltages between both electrodes of the plural unit cells,
wherein the plural unit cells are segmented to plural cell blocks,
wherein the equalizing device comprises:
a first equalizing unit selecting a smallest unit cell in the cell block, which has a smallest voltage between the both ends thereof among the plural unit cells of the cell block, and discharging each cell block by connecting both ends of the cell block and the discharging resistor until the voltage between the both ends of the smallest unit cell in the cell block reaches a target voltage, and
a second equalizing unit discharging each unit cell by connecting the both ends of the each unit cell and the discharging resistor until the each voltage between the both ends of the plural unit cells in each cell block reaches the target voltage after discharging by the first equalizing unit is completed.

2. The charge condition adjusting apparatus according to claim 1, wherein the target voltage is defined by the smallest value among the voltages between the both ends of the each unit cells detected by the voltage detecting device.

3. The charge condition adjusting apparatus according to claim 1, wherein the first equalizing unit comprises:
a first discharging unit discharging the each cell block in a first predetermined period; and
a first discharge-control unit detecting the voltage between the both ends of the smallest unit cell in the cell block by the voltage detecting device whenever the first discharging unit discharges the each cell block completely, and making the first discharging unit repeat discharging the cell block until the detected voltage between the both ends of the smallest unit cell in the cell block reaches the target voltage.

4. The charge condition adjusting apparatus according to claim 1, wherein the second equalizing unit comprises:
a second discharging unit discharging the unit cell in a second predetermined period; and
a second discharge-control unit detecting the voltage between the both ends of the unit cell by the voltage detecting device whenever the second discharging unit discharges the unit cell completely, and making the second discharging unit repeat discharging the unit cell until the detected voltage between the both ends of the unit cell reaches the target voltage.

5. The charge condition adjusting apparatus according to claim 1, wherein the first equalizing unit judges that the voltage between the both ends of the smallest unit cell in the cell block reaches the target voltage when a difference between the voltage between the both ends of the smallest unit cell in the cell block and the target voltage becomes an allowable voltage tolerance or less, wherein the second equalizing unit judges that the voltage between the both ends of the unit cell reaches the target voltage when a difference between the voltage between the both ends of the unit cell and the target voltage becomes an allowable voltage tolerance or less.

6. The charge condition adjusting apparatus according to claim 2, wherein the first equalizing unit comprises:
a first discharging unit discharging the each cell block in a first predetermined period; and
a first discharge-control unit detecting the voltage between the both ends of the smallest unit cell in the cell block by the voltage detecting device whenever the first discharging unit discharges the each cell block completely, and making the first discharging unit repeat discharging the cell block until the detected voltage between the both ends of the smallest unit cell in the cell block reaches the target voltage.

7. The charge condition adjusting apparatus according to claim 2, wherein the second equalizing unit comprises:
a second discharging unit discharging the unit cell in a second predetermined period; and
a second discharge-control unit detecting the voltage between the both ends of the unit cell by the voltage detecting device whenever the second discharging unit discharges the unit cell completely, and making the second discharging unit repeat discharging the unit cell until the detected voltage between the both ends of the unit cell reaches the target voltage.

8. The charge condition adjusting apparatus according to claim 3, wherein the second equalizing unit comprises:
a second discharging unit discharging the unit cell in a second predetermined period; and
a second discharge-control unit detecting the voltage between the both ends of the unit cell by the voltage detecting device whenever the second discharging unit discharges the unit cell completely, and making the second discharging unit repeat discharging the unit cell until the detected voltage between the both ends of the unit cell reaches the target voltage.

9. The charge condition adjusting apparatus according to claim 6, wherein the second equalizing unit comprises:
a second discharging unit discharging the unit cell in a second predetermined period; and
a second discharge-control unit detecting the voltage between the both ends of the unit cell by the voltage detecting device whenever the second discharging unit discharges the unit cell completely, and making the second discharging unit repeat discharging the unit cell until the detected voltage between the both ends of the unit cell reaches the target voltage.

10. The charge condition adjusting apparatus according to claim 2, wherein the first equalizing unit judges that the voltage between the both ends of the smallest unit cell in the cell block reaches the target voltage when a difference between the voltage between the both ends of the smallest unit cell in the cell block and the target voltage becomes an allowable voltage tolerance or less, wherein the second equalizing unit judges that the voltage between the both ends of the unit cell reaches the target voltage when a difference between the voltage between the both ends of the unit cell and the target voltage becomes an allowable voltage tolerance or less.

11. The charge condition adjusting apparatus according to claim 3, wherein the first equalizing unit judges that the voltage between the both ends of the smallest unit cell in the cell block reaches the target voltage when a difference between the voltage between the both ends of the smallest unit cell in the cell block and the target voltage becomes an allowable voltage tolerance or less, wherein the second equalizing unit judges that the voltage between the both ends of the unit cell reaches the target voltage when a difference between the voltage between the both ends of the unit cell and the target voltage becomes an allowable voltage tolerance or less.

12. The charge condition adjusting apparatus according to claim 4, wherein the first equalizing unit judges that the voltage between the both ends of the smallest unit cell in the cell block reaches the target voltage when a difference between the voltage between the both ends of the smallest unit cell in the cell block and the target voltage becomes an allowable voltage tolerance or less, wherein the second equalizing unit judges that the voltage between the both ends of the unit cell reaches the target voltage when a difference between the voltage between the both ends of the unit cell and the target voltage becomes an allowable voltage tolerance or less.

13. The charge condition adjusting apparatus according to claim 6, wherein the first equalizing unit judges that the voltage between the both ends of the smallest unit cell in the cell block reaches the target voltage when a difference between the voltage between the both ends of the smallest unit cell in the cell block and the target voltage becomes an allowable voltage tolerance or less, wherein the second equalizing unit judges that the voltage between the both ends of the unit cell reaches the target voltage when a difference between the voltage between the both ends of the unit cell and the target voltage becomes an allowable voltage tolerance or less.

14. The charge condition adjusting apparatus according to claim 7, wherein the first equalizing unit judges that the voltage between the both ends of the smallest unit cell in the cell block reaches the target voltage when a difference between the voltage between the both ends of the smallest unit cell in the cell block and the target voltage becomes an allowable voltage tolerance or less, wherein the second equalizing unit judges that the voltage between the both ends of the unit cell reaches the target voltage when a difference between the voltage between the both ends of the unit cell and the target voltage becomes an allowable voltage tolerance or less.

15. The charge condition adjusting apparatus according to claim 8, wherein the first equalizing unit judges that the voltage between the both ends of the smallest unit cell in the cell block reaches the target voltage when a difference between the voltage between the both ends of the smallest unit cell in the cell block and the target voltage becomes an allowable voltage tolerance or less, wherein the second equalizing unit judges that the voltage between the both ends of the unit cell reaches the target voltage when a difference between the voltage between the both ends of the unit cell and the target voltage becomes an allowable voltage tolerance or less.

16. The charge condition adjusting apparatus according to claim 9, wherein the first equalizing unit judges that the voltage between the both ends of the smallest unit cell in the cell block reaches the target voltage when a difference between the voltage between the both ends of the smallest unit cell in the cell block and the target voltage becomes an allowable voltage tolerance or less, wherein the second equalizing unit judges that the voltage between the both ends of the unit cell reaches the target voltage when a difference between the voltage between the both ends of the unit cell and the target voltage becomes an allowable voltage tolerance or less.

* * * * *